(12) United States Patent
Zhou et al.

(10) Patent No.: US 11,125,072 B2
(45) Date of Patent: Sep. 21, 2021

(54) TRACK SYNCHRONIZATION MOVING APPARATUS OF WELLBORE INSPECTION SYSTEM AND CONTROL METHOD THEREOF

(71) Applicant: China University of Mining and Technology, Jiangsu (CN)

(72) Inventors: Gongbo Zhou, Jiangsu (CN); Chaoquan Tang, Jiangsu (CN); Zhencai Zhu, Jiangsu (CN); Gang Zhang, Jiangsu (CN); Zhenzhi He, Jiangsu (CN); Hongwei Tang, Jiangsu (CN); Wei Li, Jiangsu (CN); Fan Jiang, Jiangsu (CN)

(73) Assignee: China University of Mining and Technology, Jiangsu (CN)

( * ) Notice: Subject to any disclaimer, the term of this patent is extended or adjusted under 35 U.S.C. 154(b) by 0 days.

(21) Appl. No.: 17/040,552

(22) PCT Filed: Nov. 11, 2019

(86) PCT No.: PCT/CN2019/117115
§ 371 (c)(1),
(2) Date: Sep. 23, 2020

(87) PCT Pub. No.: WO2021/027130
PCT Pub. Date: Feb. 18, 2021

(65) Prior Publication Data
US 2021/0262337 A1    Aug. 26, 2021

(30) Foreign Application Priority Data

Aug. 9, 2019 (CN) .......................... 201910733685.3

(51) Int. Cl.
*E21B 19/02* (2006.01)
*E21B 47/01* (2012.01)
(Continued)

(52) U.S. Cl.
CPC ................ *E21B 47/01* (2013.01); *B66D 1/36* (2013.01); *B66F 11/00* (2013.01); *E21B 19/02* (2013.01); *G05D 3/20* (2013.01)

(58) Field of Classification Search
CPC ...................................................... E21B 19/02
See application file for complete search history.

(56) References Cited

U.S. PATENT DOCUMENTS 5,211,251 A * 5/1993 Woolslayer ............. E21B 15/00
175/195
2017/0297589 A1* 10/2017 Zhou ......................... B61C 3/00
(Continued)

FOREIGN PATENT DOCUMENTS

| CN | 102682492 | 9/2012 |
| CN | 102923465 | 2/2013 |

(Continued)

OTHER PUBLICATIONS

"International Search Report (Form PCT/ISA/210)" of PCT/CN2019/117115, dated May 6, 2020, pp. 1-5.
(Continued)

*Primary Examiner* — Thomas Randazzo
(74) *Attorney, Agent, or Firm* — JCIPRNET

(57) ABSTRACT

Disclosed are a synchronous movement apparatus of tracks in a wellbore inspection system and a control method thereof. The synchronous movement apparatus includes an upper moving track, a lower moving track, an upper wire rope moving device, a lower wire rope moving device, and a control device; the upper moving track and the lower moving track are correspondingly embedded into an inner wall of a wellbore, and the upper moving track is located above the lower moving track; the upper wire rope moving device is fitted in the upper moving track, and the lower wire rope moving device is fitted in the lower moving track; the upper moving track and the lower moving track have the (Continued)

same structure and each include a track body. A rolling face is arranged on the track body, and grooves are evenly distributed on the rolling face along the extending direction of the track body.

9 Claims, 6 Drawing Sheets

(51) Int. Cl.
  *B66D 1/36* (2006.01)
  *G05D 3/20* (2006.01)
  *B66F 11/00* (2006.01)

(56) References Cited

U.S. PATENT DOCUMENTS

| | | | |
|---|---|---|---|
| 2018/0100950 A1* | 4/2018 | Yao | E21B 47/09 |
| 2019/0271796 A1* | 9/2019 | Piscsalko | E21B 47/002 |
| 2019/0330969 A1* | 10/2019 | Thursby | H04N 5/2256 |
| 2019/0377254 A1* | 12/2019 | Thursby | E21B 47/017 |
| 2020/0224525 A1* | 7/2020 | Parmeshwar | E21B 17/006 |
| 2021/0087920 A1* | 3/2021 | Scott | G06T 5/50 |
| 2021/0088546 A1* | 3/2021 | Helmore | G01P 3/68 |

FOREIGN PATENT DOCUMENTS

| | | |
|---|---|---|
| CN | 105035200 | 11/2015 |
| CN | 204873387 | 12/2015 |
| CN | 109969279 | 7/2019 |
| JP | 2006234728 | 9/2006 |
| JP | 2016037808 | 3/2016 |

OTHER PUBLICATIONS

"Written Opinion of the International Searching Authority (Form PCT/ISA/237)" of PCT/CN2019/117115, dated May 6, 2020, pp. 1-5.

\* cited by examiner

TRACK SYNCHRONIZATION MOVING APPARATUS OF WELLBORE INSPECTION SYSTEM AND CONTROL METHOD THEREOF

CROSS-REFERENCE TO RELATED APPLICATION

This application is a 371 of international application of PCT application serial no. PCT/CN2019/117115, filed on Nov. 11, 2019, which claims the priority benefit of China application no. 201910733685.3, filed on Aug. 9, 2019. The entirety of each of the above mentioned patent applications is hereby incorporated by reference herein and made a part of this specification.

BACKGROUND

Technical Field

The present invention relates to the field of mechanical engineering technologies, and in particular, to a track synchronization moving apparatus of an inspection system and a method thereof.

Description of Related Art

In mining production, a wellbore is a main doorway of a mine to the ground, and is a throat project for lifting coal (or gangue), lifting personnel, transporting materials and equipment, ventilation, and drainage during mine production. During a long-term working process of the wellbore, due to factors such as multiple strata crossing, complex geological conditions, and a harsh operating environment, the wellbore has longitudinal, circumferential, and radial strains. It is extremely difficult to find the strains in a short period of time. If evolving states of the wellbore and key facilities of the wellbore are not understood in time, it is likely that long-term accumulation will cause the wellbore to be skewed, a guide device of a lifting system to be deformed, and high-speed running of a lifting container to be blocked, and even major malignant accidents, such as fracture and water inrush of the wellbore or rope breaking and falling of the lifting container, caused when a gradual change accumulates into a sudden change. Although "Coal Mine Safety Regulations" stipulates the examination frequency and requirements for coal mine wellbore facilities, current wellbore inspections are mainly completed by manpower, have low efficiency, high costs, and high misjudgment rates, where subtle changes cannot be found in time, and it is difficult to achieve continuity and systematization of global inspections of a mine wellbore. Often due to the failure of timely inspection and repair of the in-depth environment, the industrial infrastructure working in it suffers from damages that are difficult to repair and irreparable losses.

The application No. CN201910207682.6 provides a robot that climbs along the twisting direction of a wire rope guide rail. The robot can quickly climb along a complex surface of a wire rope, which resolves problems of unstable movement and a short service life of a wire rope climbing robot. It also provides establishing an inspection system composed of inspection robots by use of robot technologies and wireless sensor network technologies so as to monitor a mine wellbore in real time. However, a mine wellbore usually has a relatively large radius and relevant industrial equipment is provided in the wellbore. Therefore, arranging a fixed wire rope in the mine wellbore cannot implement an inspection on the overall wellbore.

SUMMARY

With regard to the shortcomings in the prior art, the present invention provides a synchronous movement apparatus of tracks in a wellbore inspection system, to resolve a problem that wire ropes deflect due to different moving speeds when wire rope moving devices move along the circumferential direction of a wellbore wall.

To achieve the aforementioned technical objective, the following technical solutions are adopted in the present invention:

A synchronous movement apparatus of tracks in a wellbore inspection system is provided, including: an upper moving track, a lower moving track, an upper wire rope moving device, a lower wire rope moving device, and a control device, where the upper moving track and the lower moving track are correspondingly embedded into an inner wall of a wellbore, and the upper moving track is located above the lower moving track; the upper wire rope moving device is fitted in the upper moving track, and the lower wire rope moving device is fitted in the lower moving track; the upper wire rope moving device and the lower wire rope moving device have the same structure and each include a housing, a drive motor, and a plurality of moving rollers; a wire rope locking mechanism capable of clamping a wire rope is arranged on the housing; the moving rollers include a driving roller and one or more driven roller; each moving roller is positioned and supported through a roller shaft, and each roller shaft is mounted in the housing through a bearing; a base of the drive motor is fixedly mounted on the housing, and a power output end of the drive motor is connected through a reducer to a roller shaft supporting the driving roller; the upper moving track and the lower moving track have the same structure and each include a track body, where a rolling face is arranged on the track body, a plurality of grooves are evenly distributed on the rolling face along the extending direction of the track body, and a spacing between two adjacent grooves is D; each groove is provided therein with a position detection device configured to detect whether a moving roller falls into the groove and capable of determining position information of the moving roller falling into the groove; the position detection device can feed back detected information to the control device and is in a signal connection to the control device; the control device is connected to the drive motor of the upper wire rope moving device and the drive motor of the lower wire rope moving device separately; and the control device can automatically control running states of the drive motor of the upper wire rope moving device and the drive motor of the lower wire rope moving device according to the information fed back by the position detection device, to enable the upper wire rope moving device and the lower wire rope moving device to synchronously move.

In an improvement to the present invention, the control device can synchronously start the drive motor of the upper wire rope moving device and the drive motor of the lower wire rope moving device and apply a same fixed pulse signal a, to enable the upper wire rope moving device and the lower wire rope moving device to be driven by respective drive motors thereof to respectively perform stepped movement with a theoretical step size of L on the rolling faces of the track bodies respectively corresponding thereto until the moving roller of the upper wire rope moving device in the advancing process triggers a position detection device in a certain groove $a_i$ of the upper moving track to give a response, and the moving roller of the lower wire rope moving device in the advancing process also synchronously triggers a position detection device in a certain groove $b_j$ of the lower moving track to give a response, so that the control device receives a set of data, respectively, data detected by the position detection device in the groove $a_i$ and data detected by the position detection device in the groove $b_j$, at the same time; the control device can further determine, according to information fed back by the position detection device in the groove $a_i$ of the upper moving track and information fed back by the position detection device in the groove $b_j$ of the lower moving track, whether the upper wire rope moving device and the lower wire rope moving device are synchronously running under the action of respective fixed pulse signals thereof, and thus whether a position at which the moving roller of the upper wire rope moving device is located on the upper moving track corresponds to a position at which the moving roller of the lower wire rope moving device is located on the lower moving track; and if determining results indicate that the upper wire rope moving device and the lower wire rope moving device are not running synchronously and that a position at which the moving roller of the upper wire rope moving device is located on the upper moving track is behind a position at which the moving roller of the lower wire rope moving device is located on the lower moving track, the control device can apply another pulse signal b to the drive motor of the upper wire rope moving device to enable the upper wire rope moving device to further move forward along the rolling face of the upper moving track until the position at which the moving roller of the upper wire rope moving device is located on the upper moving track is a groove $a_{i+k}$ and corresponds to the position at which the groove $b_j$ of the lower moving track is located; or if a determining result indicates that a position at which the moving roller of the lower wire rope moving device is located on the lower moving track is behind a position at which the moving roller of the upper wire rope moving device is located on the upper moving track, the control device can apply another pulse signal c to the drive motor of the lower wire rope moving device, to enable the lower wire rope moving device to further move forward along the rolling face of the lower moving track until the position at which the moving roller of the lower wire rope moving device is located on the lower moving track is a groove $b_{j+k}$ and corresponds to the position at which the groove $a_i$ of the upper moving track is located.

In an improvement to the present invention, the position detection devices include two classes, respectively, class A position detection devices and class B position detection devices; the class A position detection devices include n position detectors, that are arranged in grooves of the upper moving track in a one-to-one correspondence manner, and according to positions thereof in the grooves of the upper moving track, starting from the initial position, are sequentially a position detector $A_0$, a position detector $A_1$, a position detector $A_2$ . . . , a position detector $A_i$ . . . , and a position detector $A_n$, where n is an integer greater than or equal to 0; the class B position detection devices include n position detectors, that are arranged in grooves of the lower moving track in a one-to-one correspondence manner, and according to positions thereof in the grooves of the lower moving track, starting from the initial position, are sequentially a position detector $B_0$, a position detector $B_1$, a position detector $B_2$ . . . , a position detector $B_j$ . . . , and a position detector $B_n$; any position detector $A_i$ in the class A position detection devices and any position detector $B_j$ in the class B position detection devices can both be connected to the control device separately; the control device can receive information detected by any position detector $A_i$ in the class A position detection devices and automatically record the information as $M_i^A$, and can also receive information detected by any position detector $B_j$ in the class B position detection devices and automatically record the information as $M_j^B$; when receiving a set of data $M_i^A$ and $M_j^B$ at the same time, the control device issues a halting instruction to stop supplying electricity to the drive motor of the upper wire rope moving device and the drive motor of the lower wire rope moving device; in this case, the moving roller of the upper wire rope moving device is located in a certain groove $a_i$ of the upper moving track, and the moving roller of the lower wire rope moving device is located in a certain groove $b_j$ of the lower moving track; the control device compares, according to the set of data $M_i^A$ and $M_j^B$ received at the same time, magnitudes of i and j in the data, to determine whether the upper wire rope moving device and the lower wire rope moving device are running synchronously under the action of the respective fixed pulse signals thereof: when i=j, it indicates that the upper wire rope moving device and the lower wire rope moving device are running synchronously; when i>j, it indicates that a position of the moving roller of the lower wire rope moving device on the lower moving track is behind a position of the moving roller of the upper wire rope moving device on the upper moving track; and when i<j, it indicates that the position of the moving roller of the upper wire rope moving device on the upper moving track is behind the position of the moving roller of the lower wire rope moving device on the lower moving track.

In an improvement to the present invention, the upper wire rope moving device and the lower wire rope moving device are both equipped with a guide mechanism; the guide mechanism includes a transverse guide mechanism and a longitudinal guide mechanism; the transverse guide mechanism includes a transverse guide support and a transverse guide roller; the transverse guide support is connected to the housing at one end and connected to the transverse guide roller at the other end, and the axial direction of the transverse guide roller is in parallel to the rolling face in which the moving roller is located; the longitudinal guide mechanism includes a longitudinal guide support and a longitudinal guide roller; the longitudinal guide support is connected to the housing at one end and connected to the longitudinal guide roller at the other end, and the axial direction of the longitudinal guide roller is perpendicular to the rolling face in which the moving roller is located; and driven by the drive motor, the driving roller operates in cooperation with the transverse guide mechanism and the longitudinal guide mechanism to implement positioning and guiding, thus driving the driven rollers to always move along the wire rope moving track.

In an improvement to the present invention, the track body further includes a transverse guide face and a longitudinal guide face; one side of the rolling face is provided with the longitudinal guide face perpendicular to the rolling face, and the other side thereof is provided with an L-shaped groove formed by a vertical section and a transverse section which communicate at the bend, the extending direction of the vertical section is perpendicular to the rolling face, an opening of the vertical section is flush with the rolling face, the extending direction of the transverse section is in parallel to the rolling face, and the transverse section has the transverse guide face in parallel to the rolling face; the moving rollers are directly placed above the rolling face; the transverse guide support is placed in the vertical section, the transverse guide roller is placed in the transverse section, one end of the transverse guide support extends out of the vertical section and then is connected to the housing, the other end of the transverse guide support is connected to the transverse guide roller hooked onto the transverse guide face, and the transverse guide roller is connected to the transverse guide face via a wire; the longitudinal guide roller is connected to the longitudinal guide face via a wire; and driven by the drive motor, the driving roller can drive the transverse guide roller to roll along the transverse guide face, the longitudinal guide roller to roll along the longitudinal guide face, and the driven rollers to roll along the rolling face.

In an improvement to the present invention, the housing is provided to be annular sector-shaped; the roller shafts are arranged along the radial direction of the annular sector-shaped housing; a fixing rack is arranged on both radial cross-sectional ends of the annular sector-shaped housing; a longitudinal guide mechanism and a transverse guide mechanism are arranged on each fixing rack; the longitudinal guide mechanism is arranged on the end of the fixing rack adjacent to an inner circumferential face of the annular sector-shaped housing; the transverse guide mechanism is arranged on the end of the fixing rack adjacent to an outer circumferential face of the annular sector-shaped housing; the two longitudinal guide mechanisms that are respectively located on the both radial cross-sectional ends of the annular sector-shaped housing are symmetrically arranged, and the two transverse guide mechanisms that are respectively arranged on the both radial cross-sectional ends of the annular sector-shaped housing are symmetrically arranged; the axis of the longitudinal guide roller is perpendicular to an annular sector-shaped surface of the annular sector-shaped housing; the axis of the transverse guide roller is in parallel to the annular sector-shaped surface of the annular sector-shaped housing; positions of the longitudinal guide support and the transverse guide support on the fixing rack can be adjusted along the radial direction of the annular sector-shaped housing.

Another technical objective of the present invention is to provide a control method for a synchronous movement apparatus of tracks in a wellbore inspection system, including the following steps:

(1) for initial positions:

placing both an upper wire rope moving device and a lower wire rope moving device at initial positions, where a moving roller of the upper wire rope moving device is located in a groove $a_0$ of an upper moving track, and a moving roller of the lower wire rope moving device is located in a groove $b_0$ of a lower moving track;

(2) for electricity supply:

connecting both the drive motor of the upper wire rope moving device and the drive motor of the lower wire rope moving device to a power supply, applying a same fixed pulse signal a, to enable the upper wire rope moving device and the lower wire rope moving device to be driven by power of the respective drive motors thereof to respectively move at a theoretical step size of L along rolling faces of track bodies respectively corresponding thereto, and then, stopping electricity supply;

(3) for determining whether the moving rollers fall into grooves at the same time:

after the upper wire rope moving device and the lower wire rope moving device move at the theoretical step size of L, if a set of data, including data detected by a position detection device in a certain groove $a_i$ of the upper moving track and data detected by a position detection device in a certain groove $b_j$ of the upper moving track, can be detected at the same time, indicating that the upper wire rope moving device and the lower wire rope moving device trigger the position detection devices in the certain grooves $a_i$ and $b_j$ in the respective track bodies thereof at the same time, determining that the moving roller of the upper wire rope moving device falls into the groove $a_i$ of the upper moving track, and the moving roller of the lower wire rope moving device falls into the groove $b_j$ of the lower moving track; otherwise, returning to step (2) until the upper wire rope moving device and the lower wire rope moving device can trigger the position detection devices in the certain grooves $a_i$ and $b_j$ of the respective moving tracks corresponding thereto at the same time; and (4) for determining synchronous running:

determining whether the upper wire rope moving device and the lower wire rope moving device are synchronously running according to information fed back by the position detection device in the groove $a_i$ and information fed back by the position detection device in the groove $b_j$: if a determining result indicates that the upper wire rope moving device and the lower wire rope moving device are running synchronously, a position at which the moving roller of the upper wire rope moving device is located on the upper moving track corresponds to a position at which the moving roller of the lower wire rope moving device is located on the lower moving track; if a determining result indicates that a position at which the moving roller of the upper wire rope moving device is located on the upper moving track is behind a position at which the moving roller of the lower wire rope moving device is located on the lower moving track, a control device can apply another pulse signal b to the drive motor of the upper wire rope moving device to enable the upper wire rope moving device to further move forward along the rolling face of the upper moving track until the position at which the moving roller of the upper wire rope moving device is located on the upper moving track is a groove ai+k and corresponds to the position at which the groove bj of the lower moving track is located; or if a determining result indicates that a position at which the moving roller of the lower wire rope moving device is located on the lower moving track is behind a position at which the moving roller of the upper wire rope moving device is located on the upper moving track, the control device can apply another pulse signal c to the drive motor of the lower wire rope moving device, to enable the lower wire rope moving device to further move forward along the rolling face of the lower moving track until the position at which the moving roller of the lower wire rope moving device is located on the lower moving track is a groove $b_{j+k}$ and corresponds to the position at which the groove $a_i$ of the upper moving track is located.

In an improvement to the present invention, the position detection devices include two classes, respectively, class A position detection devices and class B position detection devices; the class A position detection devices include n position detectors, that are arranged in grooves of the upper moving track in a one-to-one correspondence manner, and according to positions thereof in the grooves of the upper moving track, starting from the initial position, are sequentially a position detector $A_0$, a position detector $A_1$, a position detector $A_2 \ldots$, a position detector $A_i \ldots$, and a position detector $A_n$, where n is an integer greater than or equal to 0; the class B position detection devices include n position detectors, that are arranged in grooves of the lower moving track in a one-to-one correspondence manner, and according to positions thereof in the grooves of the lower moving track, starting from the initial position, are sequentially a position detector $B_0$, a position detector $B_1$, a position detector $B_2$ . . . , a position detector $B_j$ . . . , and a position detector $B_n$; any position detector $A_i$ in the class A position detection devices and any position detector $B_j$ in the class B position detection devices can both be connected to the control device separately; in step (3), whether the moving roller of the upper wire rope moving device and the moving roller of the lower wire rope moving device are both located in grooves of the respective moving tracks thereof at a moment t is determined according to whether a set of data $M_i^A$ and $M_j^B$ is received at the same moment t; when the data $M_i^A$ is received, it indicates that the moving roller of the upper wire rope moving device falls into a corresponding groove of the upper moving track; when the data $M_j^B$ is received, it indicates that the moving roller of the lower wire rope moving device falls into a corresponding groove of the lower moving track; in step (4), magnitudes of i and j in the set of data $M_i^A$ and $M_j^B$ received at the same moment are compared to determine whether the upper wire rope moving device and lower wire rope moving device are running synchronously under the action of the respective fixed pulse signals of the upper wire rope moving device and lower wire rope moving device: when i=j, it indicates that the upper wire rope moving device and the lower wire rope moving device are running synchronously; when i>j, it indicates that a position of the moving roller of the lower wire rope moving device on the lower moving track is behind a position of the moving roller of the upper wire rope moving device on the upper moving track; and when i<j, it indicates that the position of the moving roller of the upper wire rope moving device on the upper moving track is behind the position of the moving roller of the lower wire rope moving device on the lower moving track.

A third technical objective of the present invention is to provide a control device for a synchronous movement apparatus of tracks in a wellbore inspection system, including a central processing unit in which a computer program runs, where the computer program can be executed to implement the control method according to any aspect above.

A fourth technical objective of the present invention is to provide a computer-readable medium storing a computer program, where the computer program can be executed to implement the method according to any aspect above.

According to the foregoing technical solutions, compared with the prior art, the present invention has the following advantages:

(1) Movement of the wire rope moving device is controlled by a circuit (the control device and the position signal detection device), and an error generated by circuit control is corrected by a mechanical mechanism (the grooves on the rolling faces), to make synchronous movement of the upper and lower wire rope moving devices more reliable.

(2) The grooves on the wire rope moving tracks may be subdivided according to inspection precision, being applicable to inspections in various working conditions.

(3) When the wire rope moving device is located in a groove, the wire rope moving device is fixed at the groove by the acting force of the groove on the roller, to prevent the wire rope moving device from shaking left and right, and no additional mechanism is needed to fix the moving device.

Figure 1:
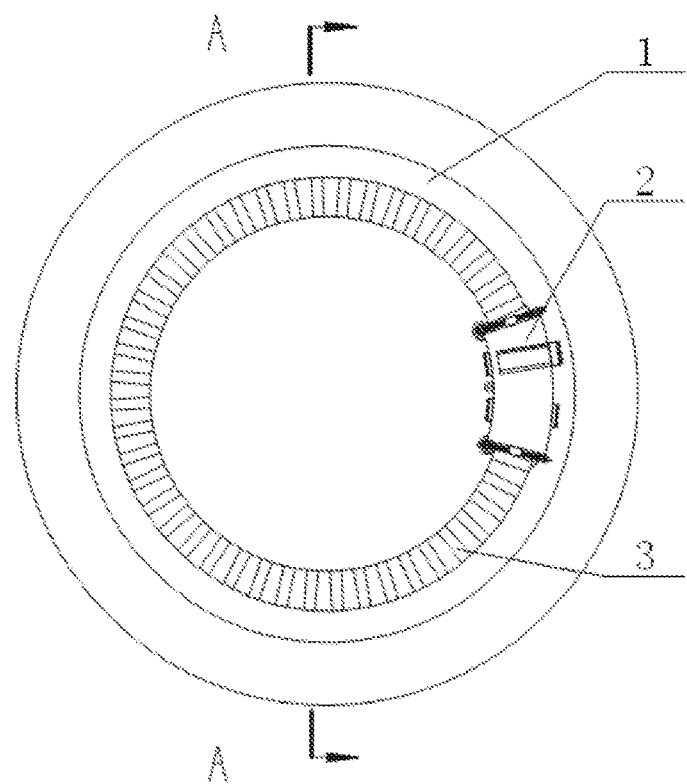
FIG. 1 is a schematic structural diagram of a wire rope moving device clamping a wire rope in a wellbore inspection system fitted on a wire rope moving track arranged on a wellbore wall.

In the figures, 1. wire rope moving track; 2. wire rope moving device; 2-1. annular sector-shaped surface of housing; 2-2. radial cross-sectional end of housing; 2-3. wire rope tensioning mechanism; 2-4. motor; 2-5. connecting bolt; 2-6. end cover of reducer; 2-7. spring; 2-8. cross bar; 2-9. longitudinal guide support; 2-10. longitudinal guide roller; 2-11. transverse guide support; 2-12. transverse guide roller; 2-13. driven roller; 2-14. reducer; 2-15. driving roller; 2-16. bearing; 2-17. limit nut of transverse guide roller; 2-18. sleeve; 3. groove.

DESCRIPTION OF THE EMBODIMENTS

The technical solutions in the embodiments of the present invention are described below clearly and completely with reference to the accompanying drawings in the embodiments of the present invention. Apparently, the described embodiments are merely some rather than all of the embodiments of the present invention. The following description of at least one exemplary embodiment is actually only illustrative, and in no way serves as any limitation to the present invention and application or use thereof. All other embodiments obtained by those of ordinary skill in the art based on the embodiments of the present invention without creative efforts shall fall within the protection scope of the present invention. Unless otherwise specified, relative arrangements, expressions, and numerical values of the components and steps described in the embodiments do not limit the scope of the present invention. In addition, it should be understood that for ease of description, the size of the parts shown in the accompanying drawings is not drawn according to actual proportional relationships. The technologies, methods, and apparatuses known to those of ordinary skill in the art may not be discussed in detail, but where appropriate, the technologies, methods, and apparatuses should be regarded as a part of the authorization specification. In all the examples shown and discussed herein, any specific value should be interpreted as merely illustrative rather than limitative. Therefore, other examples of the exemplary embodiment may have different values.

For ease of description, spatially relative terms, such as "over . . . ", "above . . . ", "on an upper surface of . . . ", and "upper" can be used herein to describe a spatial positional relationship between one device or feature and another device or feature shown in the figure. It should be understood that the spatially relative terms are intended to include different orientations in use or operation in addition to an orientation of a device described in the figure. For example, if a device in the figure is inverted, the device described as "above another device or structure" or "over another device or structure" is then positioned as "below another device or structure" or "under another device or structure". Therefore, the illustrative term "above . . . " may include two orientations, "above . . . " and "below . . . ". The device may alternatively be positioned in other different manners (be rotated by 90 degrees or be located in another orientation).

As shown in FIG. 1 to FIG. 9, the synchronous movement apparatus of tracks in a wellbore inspection system of the present invention can synchronously drive the robot that climbs along the twisting direction of a wire rope guide rail provided by Chinese patent CN201910207682.6 to move along the circumferential direction of a wellbore wall, to perform a circumferential inspection on a wellbore, thereby achieving a better monitoring effect.

Figure 2:
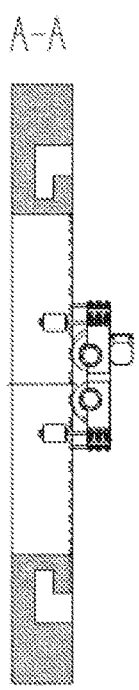
FIG. 2 is a cross-sectional view along A-A of FIG. 1.
Figure 3:
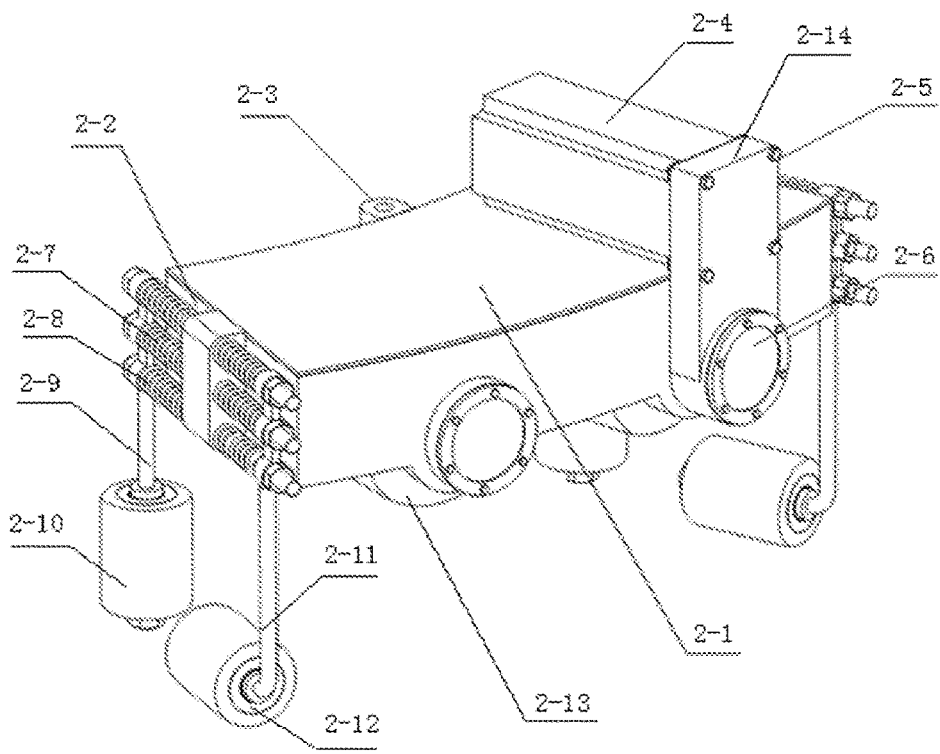
FIG. 3 is a schematic diagram of a three-dimensional structure of the wire rope moving device in FIG. 1.
Figure 4:
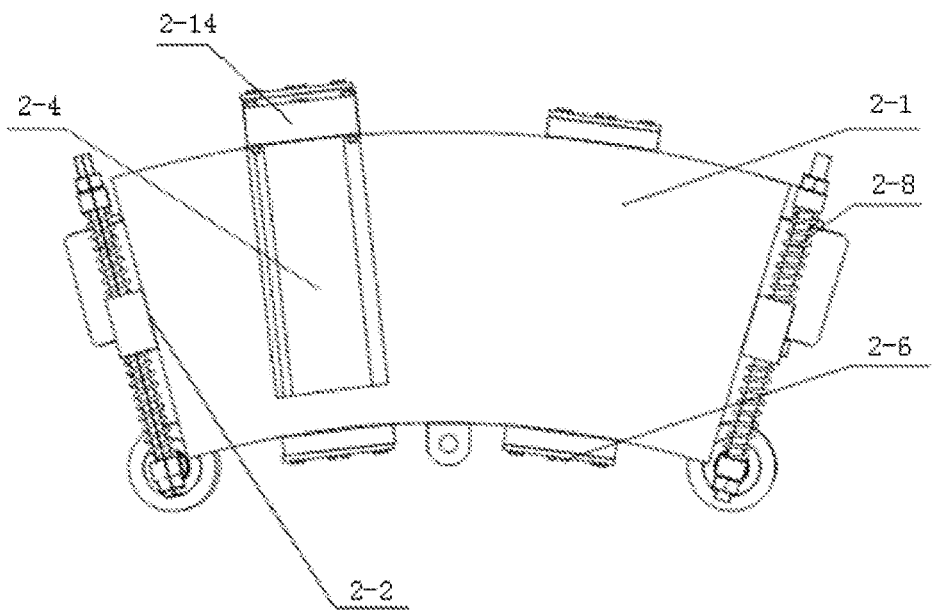
FIG. 4 is a top view of the wire rope moving device in FIG. 1.

Specifically, the synchronous movement apparatus of tracks, as shown in FIG. 1 and FIG. 2, includes a wire rope moving track arranged in a wellbore and a wire rope moving device that can carry a wire rope to move along the wire rope moving track. At the center of the wellbore, there is a cage, a counterweight, or other working equipment. Therefore, to effectively avoid interfering with normal working of the working equipment inside the wellbore, the wire rope moving track is arranged inside the wellbore near the wellbore wall. It can be seen that arranging the wire rope moving track close to the wellbore wall can effectively avoid interfering with normal working of the working equipment inside the wellbore.

There are two wire rope moving tracks (only one wire rope moving track shown in FIG. 2), respectively, an upper moving track and a lower moving track that are correspondingly embedded into an inner wall of a wellbore, and the upper moving track is located above the lower moving track. There are two wire rope moving devices, respectively, an upper wire rope moving device and a lower wire rope moving device. The upper wire rope moving device is fitted in the upper moving track, and the lower wire rope moving device is fitted in the lower moving track.

The wire rope moving device, as shown in FIG. 3 to FIG. 6, includes a housing, a drive motor, and a plurality of moving rollers. The size and number of the moving rollers can be dependent on a particular load. An outer edge of the moving roller may be wrapped with polyurethane or another cushioning material to reduce impact of vibrations of the wire rope moving device on the wire rope moving track. Two moving rollers are shown in the figures.

The housing is provided with a wire rope locking mechanism used to lock a wire rope for the robot to climb. The wire rope locking mechanism may perform locking and limiting by using a wire rope clamper currently on the market, or certainly, by using another mechanism. There may be one wire rope clamper or two or more wire rope clampers. When there is only one wire rope moving track, at least two wire rope clampers are required, so that a wire rope that the robot climbs can be carried to move along and inside the wellbore.

The moving rollers include a driving roller and one or more driven rollers (only one driven roller shown in the figures). Each moving roller is positioned and supported by a roller shaft, and each roller shaft is mounted in the housing through a bearing. A base of the drive motor is fixedly mounted on the housing, and a power output end of the drive motor is connected through a reducer to a roller shaft supporting the driving roller. Driven by the drive motor, the driving roller can drive the driven rollers to move along the wire rope moving track.

Specifically, the driven roller is connected to the housing through a roller shaft and a cylindrical roller bearing, and is axially limited at two ends by end covers of the bearing. The driving roller is connected to the housing through a roller shaft and a cylindrical roller bearing, and is axially limited at one end by an end cover of the bearing and is connected to the reducer at the other end. Power of the drive motor is transmitted from the drive motor through the reducer to the driving roller.

To ensure that the wire rope moving device can move on the wire rope moving track along a preset trajectory (the circumferential direction of the wellbore wall), the wire rope moving device in the present invention is equipped with a guide mechanism. The guide mechanism includes a transverse guide mechanism and a longitudinal guide mechanism. The longitudinal guide mechanism is configured to implement longitudinal (the axial direction of the wellbore) positioning between the wire rope moving device and the wire rope moving track, and can prevent lateral deflection of the wire rope moving device. The transverse guide mechanism is configured to implement transverse (a direction perpendicular to the axial direction of the wellbore) positioning between the wire rope moving device and the wire rope moving track.

Figure 5:
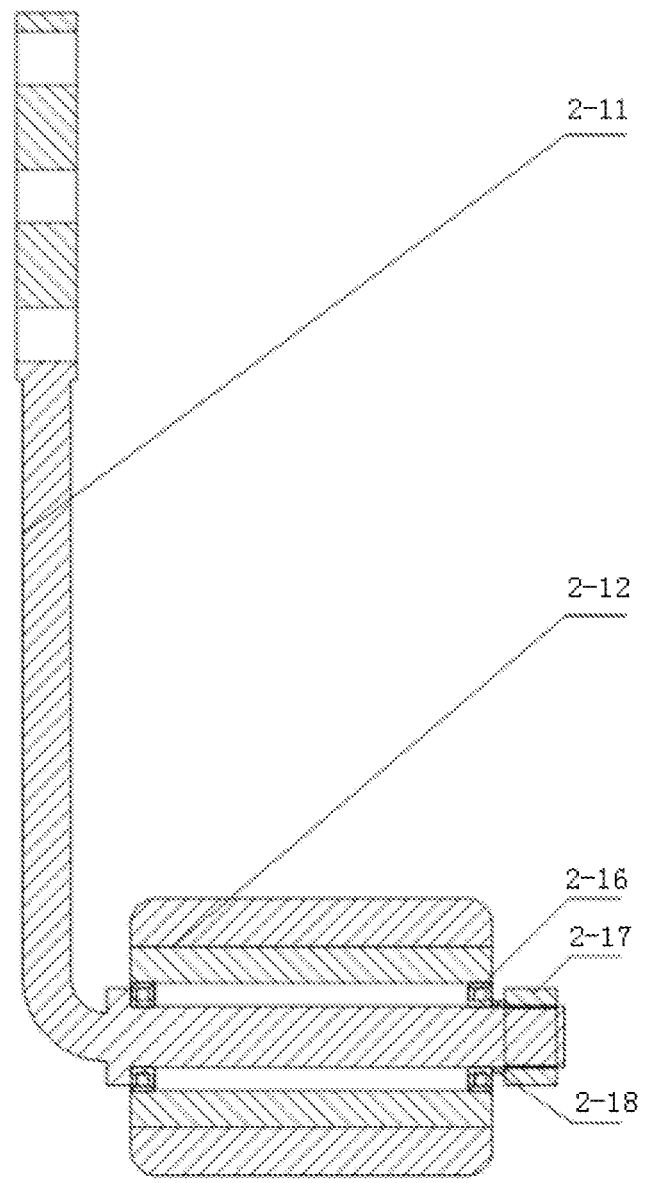
FIG. 5 is a schematic structural diagram of a transverse guide mechanism.

The transverse guide mechanism includes a transverse guide support and a transverse guide roller. The transverse guide support is connected to the housing at one end and connected to the transverse guide roller at the other end, and the axial direction of the transverse guide roller is in parallel to the rolling face in which the moving roller is located. Specifically, as shown in FIG. 5, the transverse guide support is an L-shaped rod arranged in an L shape and including a vertical section (a section of the L-shaped rod that is in parallel to the axial direction of the wellbore) and a transverse section (a section of the L-shaped rod that is in parallel to the transverse direction of the wellbore). The vertical section is connected to the housing, a shaft shoulder is arranged on the transverse section, the transverse guide roller is fitted on the transverse section at the outer side of the shaft shoulder, a bearing is mounted between the transverse guide roller and the transverse section, and a limit nut is fitted on the transverse section at the outer side of the transverse guide roller in a threaded connection manner. It can be seen that the transverse guide roller is positioned at one side by the shaft shoulder, and is positioned at the other side by the limit nut. The longitudinal guide mechanism includes a longitudinal guide support and a longitudinal guide roller. The longitudinal guide support is connected to the housing at one end and connected to the longitudinal guide roller at the other end, and the axial direction of the longitudinal guide roller is perpendicular to the rolling face in which the moving roller is located. Driven by the drive motor, the driving roller operates in cooperation with the transverse guide mechanism and the longitudinal guide mechanism to implement positioning and guiding, thus driving the driven rollers to always move along the wire rope moving track.

Figure 6:
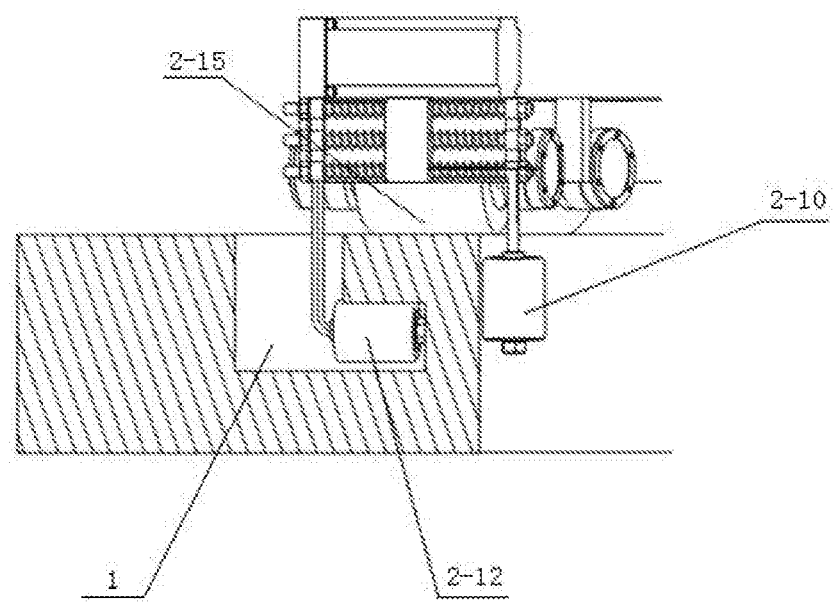
FIG. 6 is an enlarged view of a cross-sectional structure of a wire rope moving device fitted in a wire rope moving track.

To facilitate mounting of the moving rollers of the wire rope moving device and the guide rollers (including the transverse guide roller and the longitudinal guide roller) of the guide mechanism, as shown in FIG. 6, the wire rope moving track in the present invention includes a rolling face, a transverse guide face, and a longitudinal guide face. One side of the rolling face is provided with the longitudinal guide face perpendicular to the rolling face, and the other side thereof is provided with an L-shaped groove formed by a vertical section and a transverse section which communicate at the bend. The extending direction of the vertical section is perpendicular to the rolling face, and an opening of the vertical section is flush with the rolling face. The extending direction of the transverse section is in parallel to the rolling face, and the transverse section has the transverse guide face in parallel to the rolling face. The moving rollers are directly placed above the rolling face. The transverse guide support is placed in the vertical section, the transverse guide roller is placed in the transverse section. One end of the transverse guide support extends out of the vertical section and then is connected to the housing, and the other end of the transverse guide support is connected to the transverse guide roller hooked onto the transverse guide face. The transverse guide roller is connected to the transverse guide face via a wire, and the longitudinal guide roller is connected to the longitudinal guide face via a wire. Driven by the drive motor, the driving roller can drive the transverse guide roller to roll along the transverse guide face, the longitudinal guide roller to roll along the longitudinal guide face, and the driven rollers to roll along the rolling face. With such a structural design, the wire rope moving track according to the present invention on the one hand can provide a guide working face (the transverse guide face and the longitudinal guide face) for each guide roller and a moving working face (the rolling face) for each moving roller and on the other hand, may further provide a mounting space for the transverse guide mechanism and allow a main body part (the housing and the moving rollers, the drive motor, and the roller shafts separately mounted on the housing) of the wire rope moving device to be embedded into the wire rope moving track by means of the transverse guide mechanism in a particular mounting manner. It can be seen that the transverse guide mechanism according to the present invention not only has a transverse guide function, but also serves as a connection bridge between the main body part of the wire rope moving device and the wire rope moving track.

To make the wire rope moving device circumferentially move along the wellbore wall, the housing in the present invention is provided to be annular sector-shaped. Referring to FIG. 5, according to the direction shown, the annular sector-shaped housing is a semi-closed casing with an open lower end face in an annular sector shape, formed by successively connecting an upper annular sector-shaped plate, a left-side plate, a right-side plate, a front-side are plate, and a rear-side are plate. The left-side plate and the right-side plate are respectively correspondingly arranged on left and right radial cross-sectional ends of the annular sector-shaped housing. The front-side are plate is located on an outer circumferential face of the annular sector-shaped housing, and the rear-side are plate is located on an inner circumferential face of the annular sector-shaped housing. In this case, the drive motor is directly mounted on the upper surface of the upper annular sector-shaped plate, and the roller shafts are arranged along the radial direction of the annular sector-shaped housing. Moreover, the moving rollers can be exposed from the open lower end face in an annular sector shape of the annular sector-shaped housing, so that the moving rollers can directly contact with the rolling face of the wire rope moving track.

When different drive motors are selected according to different loads, facilities, such as a motor base and a coupling, may be added for fixation of drive motors according to actual requirements.

To connect the guide mechanism and the housing while ensuring stability of guiding, a fixing rack is arranged on both radial cross-sectional ends of the annular sector-shaped housing according to the present invention. A longitudinal guide mechanism and a transverse guide mechanism are arranged on each fixing rack. The longitudinal guide mechanism is arranged on the end of the fixing rack adjacent to an inner circumferential face of the annular sector-shaped housing. The transverse guide mechanism is arranged on the end of the fixing rack adjacent to an outer circumferential face of the annular sector-shaped housing. The two longitudinal guide mechanisms that are respectively located on the two radial cross-sectional ends of the annular sector-shaped housing are symmetrically arranged, and the two transverse guide mechanisms that are respectively arranged on the two radial cross-sectional ends of the annular sector-shaped housing are symmetrically arranged. The axis of the longitudinal guide roller is perpendicular to an annular sector-shaped surface of the annular sector-shaped housing. The axis of the transverse guide roller is in parallel to the annular sector-shaped surface of the annular sector-shaped housing. Positions of the longitudinal guide support and the transverse guide support on the fixing rack can be adjusted along the radial direction of the annular sector-shaped housing.

Specifically, the fixing rack includes one or more cross bars, and the cross bars are distributed at equal intervals along the height direction of the radial cross-sectional end of the annular sector-shaped housing. A fixing block is arranged on the radial cross-sectional end of the annular sector-shaped housing. The cross bars are supported and fixed by the fixing block and are arranged along the radial direction of the annular sector-shaped housing, and two ends of the cross bar are both connected to a locking nut in a threaded fitting manner. The longitudinal guide support is provided with a mounting hole a for each cross bar. The longitudinal guide support is sheathed on the corresponding cross bar through the corresponding mounting hole a, and each cross bar between the longitudinal guide support and the fixing block is sleeved by a spring a. The spring a is arranged to reduce interference of vibrations of the longitudinal guide mechanism during movement with movement of the main body part of the wire rope moving device. The transverse guide support is provided with a mounting hole b for each cross bar. The transverse guide support is sheathed on the corresponding cross bar through the corresponding mounting hole b, and each cross bar between the transverse guide support and the fixing block is sleeved by a spring b. The spring b is arranged to reduce interference of vibrations of the transverse guide mechanism during movement with movement of the main body part of the wire rope moving device.

Housings of wire rope moving devices in an upper wire rope moving device group are all embedded into the upper moving track through transverse guide rollers of respective transverse guide mechanisms and are located above the rolling face of the upper moving track. Moving rollers of the wire rope moving devices in the upper wire rope moving device group are all in a wire connection to the rolling face of the upper moving track. Housings of wire rope moving devices in a lower wire rope moving device group are all embedded into the lower moving track through transverse guide rollers of respective transverse guide mechanisms and are located below the rolling face of the lower moving track. Moving rollers of the wire rope moving devices in the lower wire rope moving device group are all in a wire connection to the rolling face of the lower moving track. In operation, the upper wire rope moving device group and the lower wire rope moving device group can move independently, and when the upper wire rope moving device group and the lower wire rope moving device group move at a same rotation speed, the robot can inspect the whole wellbore wall. When the upper wire rope moving device group and the lower wire rope moving device group move at different speeds, the robot can inspect the whole interior of the wellbore.

Further, the wire rope moving track is an annular track. The annular track is formed by splicing a plurality of arc tracks. Specifically, according to positions of a bunton and working equipment inside the wellbore, the wire rope track may be formed by multiple arc track segments that are distributed at positions where there is no interference with the bunton and the working equipment. A group of wire rope moving devices may be arranged according to actual requirements individually for each arc track, or multiple tracks may share a group of wire rope moving devices.

Because there is no rigid connection between the upper and lower wire rope moving device groups, during a wire rope movement process, errors accumulated because of different moving speeds of the upper and lower wire rope moving device groups cause a wire rope to deflect and even be wound around the working equipment inside the wellbore. Therefore, as shown in FIG. 1, the wire rope moving track according to the present invention includes a track body, and a plurality of grooves are evenly arranged circumferentially on a rolling face of the track body. The grooves are distributed on the wire rope moving track at an equal spacing, and a spacing D between the grooves may be determined according to requirements of an actual inspection. If circumferential movement of the wire rope moving device group on the wire rope moving track is dived into multiple movement points, the wire rope moving device group moves on the wire rope moving track with a groove as a unit, and the upper and lower wire rope moving device groups move at the same time and both move forward by one groove, to ensure that the wire rope is always in a vertical state. The moving devices have their own control device, controlling, according to an instruction, the upper and lower wire rope moving device groups to move at the same time. The groove on the wire rope moving track serves as an auxiliary limiting device. Using a groove as a node, movement of the wire rope moving device group on the wire rope moving track is converted into a process of moving from one groove to another groove. Briefly, the groove in the present invention is in a shape of a rectangle, and a bisector between central lines of short sides of the rectangle in which the groove is located is along the radius direction of the circular track and is the same as the axial direction of the roller of the wire rope moving device. The wire rope moving device moves along the wire rope moving track on the wire rope moving track, the roller passes through the grooves sequentially, and fixed positions of the grooves are used to limit the upper and lower wire rope moving device groups to be at a same vertical line.

In addition to the rectangle, the groove of the wire rope moving track may alternatively be in a shape such as a cylinder or a prism, and may have different depths to facilitate movement of wire rope moving devices with different volumes and cooperation thereof with the grooves. When the wire rope moving device is located at a position other than the middle position in the groove, the force that the wire rope moving device is subjected to cannot reach a balance. In this case, the wire rope moving devices can all roll to the middle positions of the grooves under the action of the tension forces of the wire ropes and the supporting forces of the grooves for the wire rope moving devices, to achieve the effect of limiting the wire rope moving devices by the grooves.

The width of the groove of the wire rope moving track can be determined according to the control precision of the wire rope moving device, and even though a certain error is generated for the wire rope moving device in the movement process, after being powered off, the wire rope moving device can still slide to the middle position in the groove according to the gravity of the wire rope moving device and the tension force of the wire rope.

A corresponding sensor (position detection device) is arranged in the groove of the wire rope moving track. For example, a range sensor or a pressure sensor is used. However, the sensor is not limited to the two types of sensors. Another sensor that can satisfy requirements can also be used to detect whether the wire rope moving device falls into the groove and record positions at which the upper and lower wire rope moving devices are located. The position detection device can feed back detected information to the control device and is in a signal connection to the control device. The control device is connected to the drive motor of the upper wire rope moving device and the drive motor of the lower wire rope moving device separately. The control device can automatically control running states of the drive motor of the upper wire rope moving device and the drive motor of the lower wire rope moving device according to the information fed back by the position detection devices, to enable the upper wire rope moving device and the lower wire rope moving device to synchronously move.

Figure 7:
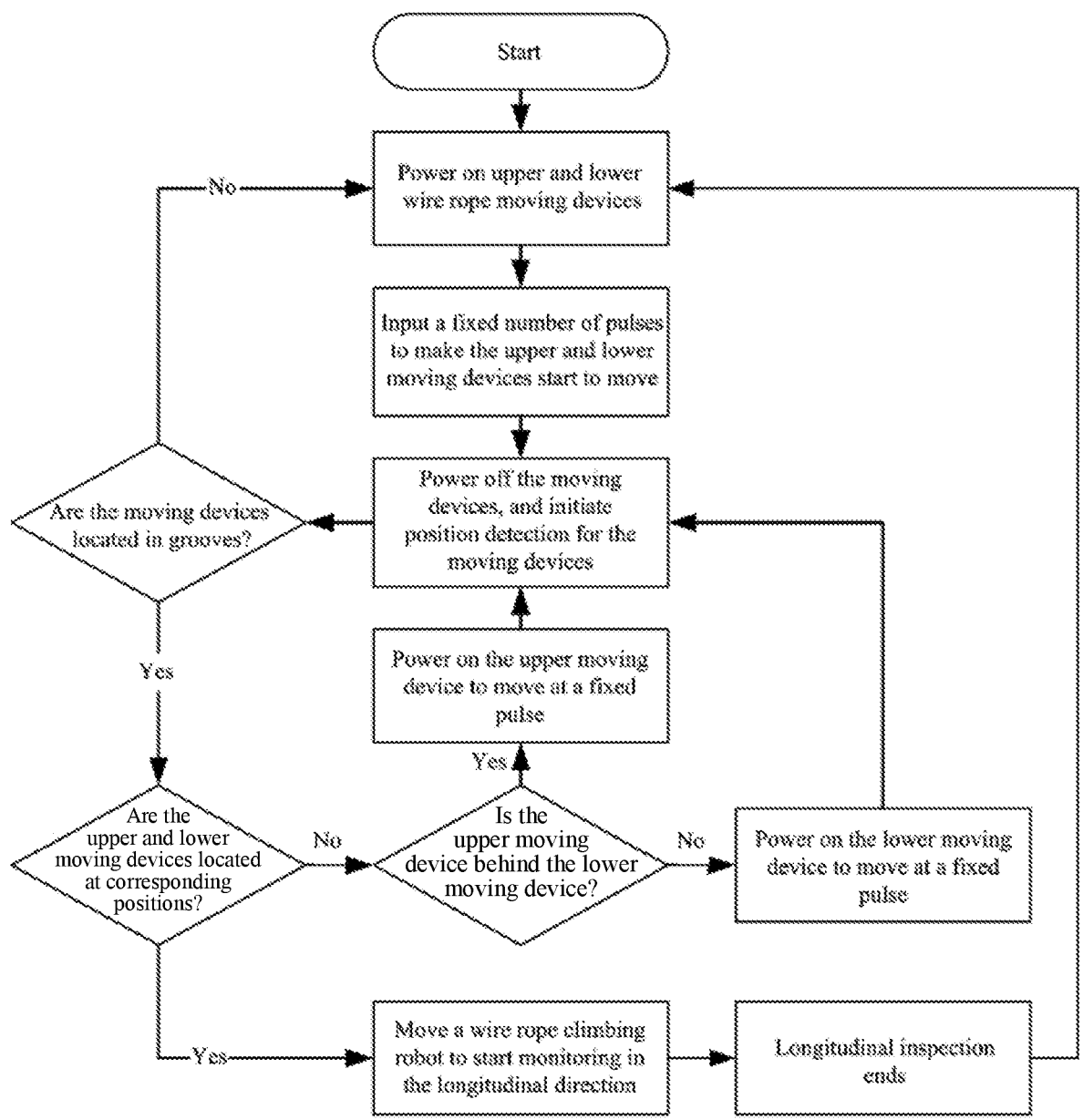
FIG. 7 is a flowchart of a method for controlling synchronous movement of wire rope moving devices according to the present invention.
Figure 8:
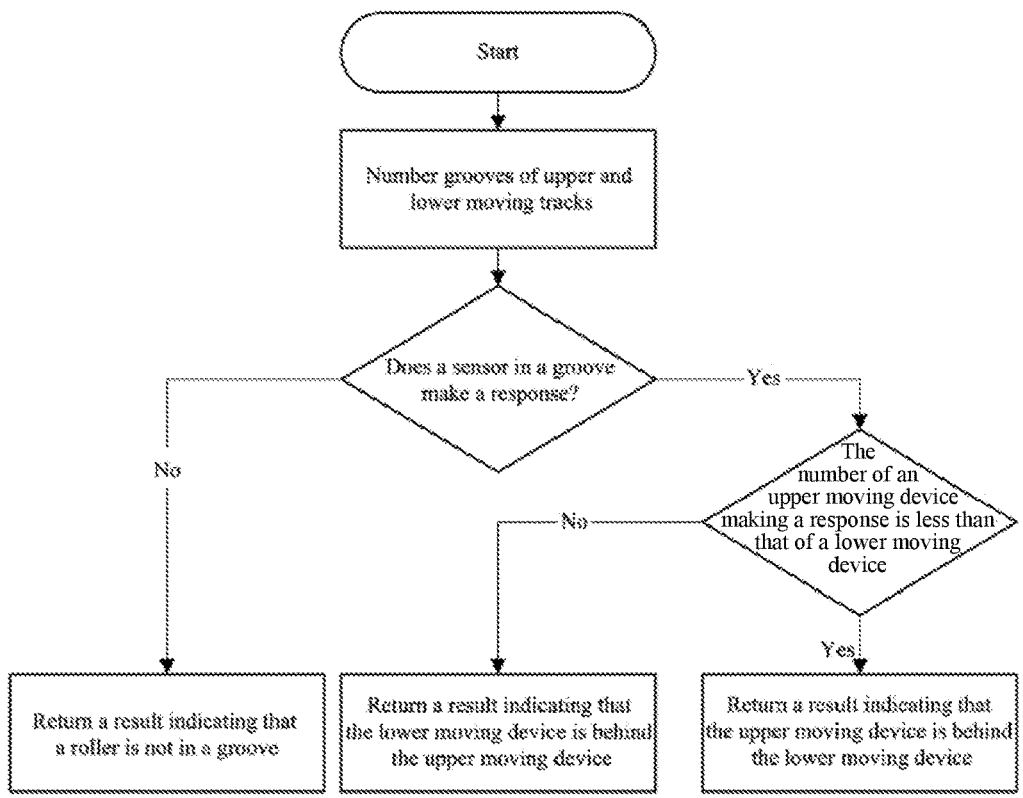
FIG. 8 is a flowchart of a method for detecting a position of a moving device according to the present invention.

As shown in FIG. 7 and FIG. 8, the present invention discloses a control method for a synchronous movement apparatus of tracks in a wellbore inspection system, including the following steps:

(1) for initial positions:

placing both an upper wire rope moving device and a lower wire rope moving device at initial positions, where a moving roller of the upper wire rope moving device is located in a groove $a_0$ of an upper moving track, and a moving roller of the lower wire rope moving device is located in a groove $b_0$ of a lower moving track;

(2) for electricity supply:

connecting both the drive motor of the upper wire rope moving device and the drive motor of the lower wire rope moving device to a power supply, applying a same fixed pulse signal a, to enable the upper wire rope moving device and the lower wire rope moving device to be driven by power of the respective drive motors thereof to respectively move at a theoretical step size of L along rolling faces of track bodies respectively corresponding thereto, and then, stopping electricity supply;

(3) for determining whether to fall into grooves at the same time:

after the upper wire rope moving device and the lower wire rope moving device move at the theoretical step size of L, if a set of data, including data detected by a position detection device in a certain groove $a_i$ of the upper moving track and data detected by a position detection device in a certain groove $b_j$ of the upper moving track, can be detected at the same time, indicating that the upper wire rope moving device and the lower wire rope moving device trigger the position detection devices in the certain grooves $a_i$ and $b_j$ in the respective track bodies thereof at the same time, determining that the moving roller of the upper wire rope moving device falls into the groove $a_i$ of the upper moving track, and the moving roller of the lower wire rope moving device falls into the groove $b_j$ of the lower moving track; otherwise, returning to step (2) until the upper wire rope moving device and the lower wire rope moving device can trigger the position detection devices in the certain grooves $a_i$ and $b_j$ of the respective moving tracks corresponding thereto at the same time, where i and j∈n, n represents a total number of grooves of the upper moving track/lower moving track, and n≥0.

(4) for determining synchronous running:

determining whether the upper wire rope moving device and the lower wire rope moving device are synchronously running according to information fed back by the position detection device in the groove $a_i$ and information fed back by the position detection device in the groove $b_j$: if a determining result indicates that the upper wire rope moving device and the lower wire rope moving device are running synchronously, it indicates that a position at which the moving roller of the upper wire rope moving device is located on the upper moving track corresponds to a position at which the moving roller of the lower wire rope moving device is located on the lower moving track; if a determining result indicates that a position at which the moving roller of the upper wire rope moving device is located on the upper moving track is behind a position at which the moving roller of the lower wire rope moving device is located on the lower moving track, a control device can apply another pulse signal b to the drive motor of the upper wire rope moving device to enable the upper wire rope moving device to further move forward along the rolling face of the upper moving track until the position at which the moving roller of the upper wire rope moving device is located on the upper moving track is a groove $a_{i+k}$ and corresponds to the position at which the groove $b_j$ of the lower moving track is located, where i+k=j; or if a determining result indicates that a position at which the moving roller of the lower wire rope moving device is located on the lower moving track is behind a position at which the moving roller of the upper wire rope moving device is located on the upper moving track, the control device can apply another pulse signal c to the drive motor of the lower wire rope moving device, to enable the lower wire rope moving device to further move forward along the rolling face of the lower moving track until the position at which the moving roller of the lower wire rope moving device is located on the lower moving track is a groove $b_{j+k}$ and corresponds to the position at which the groove $a_i$ of the upper moving track is located, where j+k=i.

According to the foregoing control method, it can be known that the control device in the present invention can synchronously start the drive motor of the upper wire rope moving device and the drive motor of the lower wire rope moving device and apply a same fixed pulse signal a, to enable the upper wire rope moving device and the lower wire rope moving device to be driven by respective drive motors thereof to respectively perform stepped movement with a theoretical step size of L on the rolling faces of the track bodies respectively corresponding thereto until the moving roller of the upper wire rope moving device in the advancing process triggers a position detection device in a certain groove $a_i$ of the upper moving track to give a response, and the moving roller of the lower wire rope moving device in the advancing process also synchronously triggers a position detection device in a certain groove $b_j$ of the lower moving track to give a response, so that the control device receives a set of data, respectively, data detected by the position detection device in the groove $a_i$ and data detected by the position detection device in the groove $b_j$, at the same time; the control device can further determine, according to information fed back by the position detection device in the groove $a_i$ of the upper moving track and information fed back by the position detection device in the groove $b_j$ of the lower moving track, whether the upper wire rope moving device and the lower wire rope moving device are synchronously running under the action of respective fixed pulse signals thereof, and thus whether a position at which the moving roller of the upper wire rope moving device is located on the upper moving track corresponds to a position at which the moving roller of the lower wire rope moving device is located on the lower moving track; and if determining results indicate that the upper wire rope moving device and the lower wire rope moving device are not running synchronously and that a position at which the moving roller of the upper wire rope moving device is located on the upper moving track is behind a position at which the moving roller of the lower wire rope moving device is located on the lower moving track, the control device can apply another pulse signal b to the drive motor of the upper wire rope moving device to enable the upper wire rope moving device to further move forward along the rolling face of the upper moving track until the position at which the moving roller of the upper wire rope moving device is located on the upper moving track is $a_i$ groove and corresponds to the position at which the groove $b_j$ of the lower moving track is located; or if a determining result indicates that a position at which the moving roller of the lower wire rope moving device is located on the lower moving track is behind a position at which the moving roller of the upper wire rope moving device is located on the upper moving track, the control device can apply another pulse signal c to the drive motor of the lower wire rope moving device, to enable the lower wire rope moving device to further move forward along the rolling face of the lower moving track until the position at which the moving roller of the lower wire rope moving device is located on the lower moving track is a groove $b_j$ and corresponds to the position at which the groove $a_i$ of the upper moving track is located.

The present invention may provide a control device for a synchronous movement apparatus of tracks in a wellbore inspection system, including a central processing unit in which a computer program runs, where the computer program can be executed to implement the foregoing control method.

The present invention may further provide a computer-readable medium storing a computer program, where the computer program can be executed to implement the foregoing method.

In the present invention, information detected by the position detection device is associated with a position of the groove on the rolling face in which the position detection device is located, so that whether the upper and lower moving devices are running synchronously can be conveniently determined, and details are provided as follows.

Figure 9:
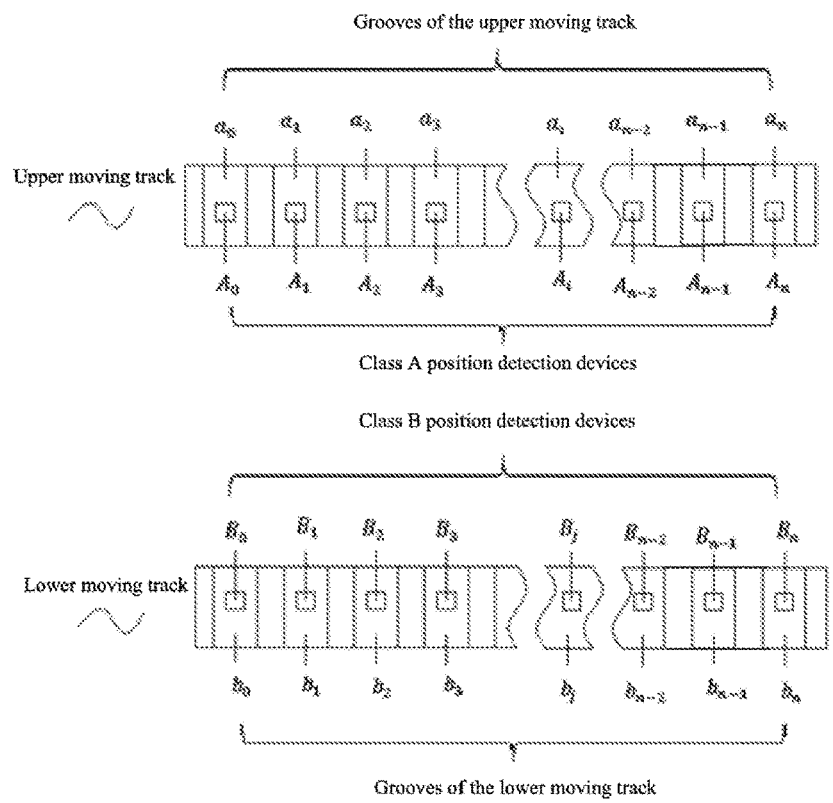
FIG. 9 is a schematic diagram of unfolded structures of an upper moving track and a lower moving track according to the present invention.

As shown in FIG. 9, the position detection devices include two classes, respectively, class A position detection devices and class B position detection devices. The class A position detection devices include n position detectors, that are arranged in grooves of the upper moving track in a one-to-one correspondence manner and according to positions thereof in the grooves of the upper moving track (starting from the initial position, the grooves are a groove $a_0$, a groove $a_1$, a groove $a_2$ . . . , a groove $a_i$ . . . , and a groove $a_n$ in sequence), starting from the initial position, are sequentially a position detector $A_0$, a position detector $A_1$, a position detector $A_2$ . . . , a position detector $A_i$ . . . , and a position detector $A_n$, where n is an integer greater than or equal to 0. That is, the position detectors of the upper moving track are sequentially arranged in one-to-one correspondence with the grooves of the upper moving track. The class B position detection devices include n position detectors, that are arranged in grooves of the lower moving track in a one-to-one correspondence manner and according to positions thereof in the grooves of the lower moving track (starting from the initial position, the grooves are a groove $b_0$, a groove $b_1$, a groove $B_2$ ..., a groove $B_j$ ..., and a groove $B_n$ in sequence), starting from the initial position, are sequentially a position detector $B_0$, a position detector $B_1$, a position detector $B_2$ ..., a position detector $B_j$ ..., and a position detector $B_n$. That is, the position detectors of the lower moving track are sequentially arranged in one-to-one correspondence with the grooves of the lower moving track.

Any position detector $A_i$ in the class A position detection devices and any position detector $B_j$ in the class B position detection devices can both be connected to the control device separately. The control device can receive information detected by any position detector $A_i$ in the class A position detection devices and automatically record the information as $M_i^A$. In other words, pieces of information detected by the position detector $A_0$, the position detector $A_1$, the position detector $A_2$ ..., the position detector $A_i$ ..., and the position detector $A_n$ are sequentially recorded as $M_0^A$, $M_1^A$, $M_2^A$ ..., $M_i^A$ ..., and $M_n^A$. Information detected by any position detector $B_j$ in the class B position detection devices can also be received and automatically recorded as $M_j^B$. In other words, pieces of information detected by the position detector $B_0$, the position detector $B_1$, the position detector $B_2$ ..., the position detector $B_j$ ..., and the position detector $B_n$ are sequentially $M_0^B$, $M_1^B$, $M_2^B$ ..., $M_j^B$ ..., and $M_n^B$.

Therefore, in step (3), whether the moving roller of the upper wire rope moving device and the moving roller of the lower wire rope moving device are both located in grooves of the respective moving tracks thereof at a moment t is determined according to whether a set of data $M_i^A$ and $M_j^B$ is received at the same moment t. When the data $M_i^A$ is received, it indicates that the moving roller of the upper wire rope moving device falls into a corresponding groove of the upper moving track. When the data $M_j^B$ is received, it indicates that the moving roller of the lower wire rope moving device falls into a corresponding groove of the lower moving track. In step (4), magnitudes of i and j in the set of data $M_i^A$ and $M_j^B$ received at the same moment are compared to determine whether the upper wire rope moving device and the lower wire rope moving device are running synchronously under the action of the respective fixed pulse signals thereof: when i=j, it indicates that the upper wire rope moving device and the lower wire rope moving device are running synchronously. When i>j, it indicates that a position of the moving roller of the lower wire rope moving device on the lower moving track is behind a position of the moving roller of the upper wire rope moving device on the upper moving track. When i<j, it indicates that the position of the moving roller of the upper wire rope moving device on the upper moving track is behind the position of the moving roller of the lower wire rope moving device on the lower moving track.

Because the position detection devices in the grooves of the upper moving track and the lower moving track in the present invention are arranged in the foregoing manner, when receiving a set of data $M_i^A$ and $M_j^B$ at the same time, the control device issues a halting instruction to stop supplying electricity to the drive motor of the upper wire rope moving device and the drive motor of the lower wire rope moving device. In this case, the moving roller of the upper wire rope moving device is located in a certain groove $a_i$ of the upper moving track, and the moving roller of the lower wire rope moving device is located in a certain groove $b_j$ of the lower moving track. The control device compares, according to the set of data $M_i^A$ and $M_j^B$ received at the same time, magnitudes of i and j in the data, to determine whether the upper wire rope moving device and the lower wire rope moving device are running synchronously under the action of the respective fixed pulse signals thereof: when i=j, it indicates that the upper wire rope moving device and the lower wire rope moving device are running synchronously. When i>j, it indicates that a position of the moving roller of the lower wire rope moving device on the lower moving track is behind a position of the moving roller of the upper wire rope moving device on the upper moving track. When i<j, it indicates that the position of the moving roller of the upper wire rope moving device on the upper moving track is behind the position of the moving roller of the lower wire rope moving device on the lower moving track.

An operation method of a specific embodiment of the present invention includes the following steps:

Step 1: Starting stage: determining whether upper and lower wire rope moving devices are at corresponding groove starting points, powering on the upper and lower wire rope moving devices, and inputting a same number of fixed pulses for the upper and lower wire rope moving devices, to make the wire rope moving devices start to move and move by a fixed length.

Step 2: Running stage: after the wire rope moving devices run at the fixed pulses, powering off the wire rope moving devices, to enable the wire rope moving devices to slide, when a position error during movement is generated, to correct positions in the grooves under the action of the tension force of the wire rope; starting detection devices in the grooves to determine whether the wire rope moving devices accurately enter the grooves and determine positions at which the wire rope moving devices falls into the grooves; adjusting running of the upper and lower wire rope moving devices according to the positions at which the upper and lower wire rope moving device fall into the grooves, to make the upper and lower wire rope moving devices fall into given positions, and starting a longitudinal inspection of the wellbore; after the inspection ends, repeating the movement process of the wire rope moving devices; and completing the inspection of the whole wellbore.

Step 3: Stopping stage: after the wellbore inspection ends, returning to the starting points of the wire rope moving devices, and waiting for a next inspection task to start.

What is claimed is:

1. A synchronous movement apparatus of tracks in a wellbore inspection system, comprising: an upper moving track, a lower moving track, an upper wire rope moving device, a lower wire rope moving device, and a control device, wherein the upper moving track and the lower moving track are correspondingly embedded into an inner wall of a wellbore, and the upper moving track is located above the lower moving track; and the upper wire rope moving device is fitted in the upper moving track, and the lower wire rope moving device is fitted in the lower moving track; wherein the upper wire rope moving device and the lower wire rope moving device have the same structure and each comprise a housing, a drive motor, and a plurality of moving rollers;

a wire rope locking mechanism capable of clamping a wire rope is arranged on the housing;

the moving rollers comprise a driving roller and one or more driven roller;

each moving roller is positioned and supported by a roller shaft, and each roller shaft is mounted in the housing through a bearing; a base of the drive motor is fixedly mounted on the housing, and a power output end of the drive motor is connected through a reducer to a roller shaft supporting the driving roller;

the upper moving track and the lower moving track have the same structure and each comprise a track body, wherein a rolling face is arranged on the track body, a plurality of grooves are evenly distributed on the rolling face along an extending direction of the track body, and a spacing between two adjacent grooves is D; each groove is provided therein with a position detection device configured to detect whether a moving roller falls into the groove and capable of determining position information of the moving roller falling into the groove; the position detection device can feed back detected information to the control device and is in a signal connection to the control device; the control device is connected to the drive motor of the upper wire rope moving device and the drive motor of the lower wire rope moving device separately; and the control device can automatically control running states of the drive motor of the upper wire rope moving device and the drive motor of the lower wire rope moving device according to the information fed back by the position detection devices, to enable the upper wire rope moving device and the lower wire rope moving device to synchronously move.

2. The synchronous movement apparatus of tracks in a wellbore inspection system according to claim 1, wherein the control device can synchronously start the drive motor of the upper wire rope moving device and the drive motor of the lower wire rope moving device and apply a same fixed pulse signal a, to enable the upper wire rope moving device and the lower wire rope moving device to be driven by respective drive motors thereof to respectively perform stepped movement with a theoretical step size of L on the rolling faces of the track bodies respectively corresponding thereto until the moving roller of the upper wire rope moving device in the advancing process triggers a position detection device in a certain groove $a_i$ of the upper moving track to give a response, and the moving roller of the lower wire rope moving device in the advancing process also synchronously triggers a position detection device in a certain groove $b_j$ of the lower moving track to give a response, so that the control device receives a set of data, respectively, data detected by the position detection device in the groove $a_i$ and data detected by the position detection device in the groove $b_j$, at the same time;

the control device can further determine, according to information fed back by the position detection device in the groove $a_i$ of the upper moving track and information fed back by the position detection device in the groove $b_j$ of the lower moving track, whether the upper wire rope moving device and the lower wire rope moving device are synchronously running under the action of respective fixed pulse signals thereof, and thus whether a position at which the moving roller of the upper wire rope moving device is located on the upper moving track corresponds to a position at which the moving roller of the lower wire rope moving device is located on the lower moving track; and if determining results indicate that the upper wire rope moving device and the lower wire rope moving device are not running synchronously and that a position at which the moving roller of the upper wire rope moving device is located on the upper moving track is behind a position at which the moving roller of the lower wire rope moving device is located on the lower moving track, the control device can apply another pulse signal b to the drive motor of the upper wire rope moving device to enable the upper wire rope moving device to further move forward along the rolling face of the upper moving track until the position at which the moving roller of the upper wire rope moving device is located on the upper moving track is a groove $a_{i+k}$ and corresponds to the position at which the groove $b_j$ of the lower moving track is located; or if a determining result indicates that a position at which the moving roller of the lower wire rope moving device is located on the lower moving track is behind a position at which the moving roller of the upper wire rope moving device is located on the upper moving track, the control device can apply another pulse signal c to the drive motor of the lower wire rope moving device, to enable the lower wire rope moving device to further move forward along the rolling face of the lower moving track until the position at which the moving roller of the lower wire rope moving device is located on the lower moving track is a groove $b_{j+k}$ and corresponds to the position at which the groove $a_i$ of the upper moving track is located.

3. The synchronous movement apparatus of tracks in a wellbore inspection system according to claim 2, wherein the position detection devices comprise two classes, respectively, class A position detection devices and class B position detection devices;

the class A position detection devices comprise n position detectors, that are arranged in grooves of the upper moving track in a one-to-one correspondence manner, and according to positions thereof in the grooves of the upper moving track, starting from the initial position, are sequentially a position detector $A_0$, a position detector $A_1$, a position detector $A_2$ . . . , a position detector $A_i$ . . . , and a position detector $A_n$, wherein n is an integer greater than or equal to 0;

the class B position detection devices comprise n position detectors, that are arranged in grooves of the lower moving track in a one-to-one correspondence manner, and according to positions thereof in the grooves of the lower moving track, starting from the initial position, are sequentially a position detector $B_0$, a position detector $B_1$, a position detector $B_2$ . . . , a position detector $B_j$ . . . , and a position detector $B_n$;

any position detector $A_i$ in the class A position detection devices and any position detector $B_j$ in the class B position detection devices can both be connected to the control device separately;

the control device can receive information detected by any position detector $A_i$ in the class A position detection devices and automatically record the information as $M_i^A$, and can also receive information detected by any position detector $B_j$ in the class B position detection devices and automatically record the information as $M_j^B$;

when receiving a set of data $M_i^A$ and $M_j^B$ at the same time, the control device issues a halting instruction to stop supplying electricity to the drive motor of the upper wire rope moving device and the drive motor of the lower wire rope moving device; in this case, the moving roller of the upper wire rope moving device is located in a certain groove $a_i$ of the upper moving track, and the moving roller of the lower wire rope moving device is located in a certain groove $b_j$ of the lower moving track;

the control device compares, according to the set of data $M_i^A$ and $M_j^B$ received at the same time, magnitudes of i and j in the data, to determine whether the upper wire rope moving device and the lower wire rope moving device are running synchronously under the action of the respective fixed pulse signals thereof: when i=j, it indicates that the upper wire rope moving device and the lower wire rope moving device are running synchronously; when i>j, it indicates that a position of the moving roller of the lower wire rope moving device on the lower moving track is behind a position of the moving roller of the upper wire rope moving device on the upper moving track; and when i<j, it indicates that the position of the moving roller of the upper wire rope moving device on the upper moving track is behind the position of the moving roller of the lower wire rope moving device on the lower moving track.

4. The synchronous movement apparatus of tracks in a wellbore inspection system according to claim 1, wherein the upper wire rope moving device and the lower wire rope moving device are both equipped with a guide mechanism; the guide mechanism comprises a transverse guide mechanism and a longitudinal guide mechanism;

the transverse guide mechanism comprises a transverse guide support and a transverse guide roller; the transverse guide support is connected to the housing at one end and connected to the transverse guide roller at the other end, and an axial direction of the transverse guide roller is in parallel to the rolling face in which the moving roller is located;

the longitudinal guide mechanism comprises a longitudinal guide support and a longitudinal guide roller; the longitudinal guide support is connected to the housing at one end and connected to the longitudinal guide roller at the other end, and an axial direction of the longitudinal guide roller is perpendicular to the rolling face in which the moving roller is located; and driven by the drive motor, the driving roller operates in cooperation with the transverse guide mechanism and the longitudinal guide mechanism to implement positioning and guiding, thus driving the driven rollers to always move along the wire rope moving track.

5. The synchronous movement apparatus of tracks in a wellbore inspection system according to claim 4, wherein the track body further comprises a transverse guide face and a longitudinal guide face;

one side of the rolling face is provided with the longitudinal guide face perpendicular to the rolling face, the other side thereof is provided with an L-shaped groove formed by a vertical section and a transverse section which communicate at the bend, an extending direction of the vertical section is perpendicular to the rolling face, an opening of the vertical section is flush with the rolling face, an extending direction of the transverse section is in parallel to the rolling face, and the transverse section has the transverse guide face in parallel to the rolling face;

the moving rollers are directly placed above the rolling face;

the transverse guide support is placed in the vertical section, the transverse guide roller is placed in the transverse section, one end of the transverse guide support extends out of the vertical section and then is connected to the housing, the other end of the transverse guide support is connected to the transverse guide roller hooked onto the transverse guide face, and the transverse guide roller is connected to the transverse guide face via a wire; the longitudinal guide roller is connected to the longitudinal guide face via a wire; and driven by the drive motor, the driving roller can drive the transverse guide roller to roll along the transverse guide face, the longitudinal guide roller to roll along the longitudinal guide face, and the driven rollers to roll along the rolling face.

6. The synchronous movement apparatus of tracks in a wellbore inspection system according to claim 5, wherein the housing is provided as an annular sector-shaped housing; the roller shafts are arranged along a radial direction of the annular sector-shaped housing;

a fixing rack is arranged on both radial cross-sectional ends of the annular sector-shaped housing; one longitudinal guide mechanism and one transverse guide mechanism are arranged on each fixing rack;

the longitudinal guide mechanism is arranged on the end of the fixing rack adjacent to an inner circumferential face of the annular sector-shaped housing; the transverse guide mechanism is arranged on the end of the fixing rack adjacent to an outer circumferential face of the annular sector-shaped housing;

the two longitudinal guide mechanisms that are respectively located on the both radial cross-sectional ends of the annular sector-shaped housing are symmetrically arranged, and the two transverse guide mechanisms that are respectively arranged on the both radial cross-sectional ends of the annular sector-shaped housing are symmetrically arranged;

the axis of the longitudinal guide roller is perpendicular to an annular sector-shaped surface of the annular sector-shaped housing; the axis of the transverse guide roller is in parallel to the annular sector-shaped surface of the annular sector-shaped housing;

positions of the longitudinal guide support and the transverse guide support on the fixing rack can be adjusted along the radial direction of the annular sector-shaped housing.

7. A control method for a synchronous movement apparatus of tracks in a wellbore inspection system, comprising the following steps:

(1) for initial positions:

placing both an upper wire rope moving device and a lower wire rope moving device at initial positions, wherein a moving roller of the upper wire rope moving device is located in a groove $a_0$ of an upper moving track, and a moving roller of the lower wire rope moving device is located in a groove $b_0$ of a lower moving track;

(2) for electricity supply:

connecting both a drive motor of the upper wire rope moving device and a drive motor of the lower wire rope moving device to a power supply, applying a same fixed pulse signal a, to enable the upper wire rope moving device and the lower wire rope moving device to be driven by power of the respective drive motors thereof, to respectively move at a theoretical step size of L along rolling faces of track bodies respectively corresponding thereto, and then, stopping electricity supply;

(3) for determining whether the moving rollers fall into grooves at the same time:

after the upper wire rope moving device and the lower wire rope moving device move at the theoretical step size of L, if a set of data, including data detected by a position detection device in a certain groove $a_i$ of the upper moving track and data detected by a position detection device in a certain groove $b_j$ of the upper moving track, can be detected at the same time, indicating that the upper wire rope moving device and the lower wire rope moving device trigger the position detection devices in the certain grooves $a_i$ and $b_j$ in the respective track bodies thereof at the same time, determining that the moving roller of the upper wire rope moving device falls into the groove $a_i$ of the upper moving track, and the moving roller of the lower wire rope moving device falls into the groove $b_j$ of the lower moving track; otherwise, returning to step (2) until the upper wire rope moving device and the lower wire rope moving device can trigger the position detection devices in the certain grooves $a_i$ and $b_j$ of the respective moving tracks corresponding thereto at the same time; and (4) for determining synchronous running:

determining whether the upper wire rope moving device and the lower wire rope moving device are synchronously running according to information fed back by the position detection device in the groove $a_i$ and information fed back by the position detection device in the groove $b_j$:

if a determining result indicates that the upper wire rope moving device and the lower wire rope moving device are running synchronously, it indicates that a position at which the moving roller of the upper wire rope moving device is located on the upper moving track corresponds to a position at which the moving roller of the lower wire rope moving device is located on the lower moving track;

if a determining result indicates that a position at which the moving roller of the upper wire rope moving device is located on the upper moving track is behind a position at which the moving roller of the lower wire rope moving device is located on the lower moving track, a control device can apply another pulse signal b to the drive motor of the upper wire rope moving device to enable the upper wire rope moving device to further move forward along the rolling face of the upper moving track until the position at which the moving roller of the upper wire rope moving device is located on the upper moving track is a groove $a_{i+k}$ and corresponds to the position at which the groove $b_j$ of the lower moving track is located; or if a determining result indicates that a position at which the moving roller of the lower wire rope moving device is located on the lower moving track is behind a position at which the moving roller of the upper wire rope moving device is located on the upper moving track, the control device can apply another pulse signal c to the drive motor of the lower wire rope moving device, to enable the lower wire rope moving device to further move forward along the rolling face of the lower moving track until the position at which the moving roller of the lower wire rope moving device is located on the lower moving track is a groove $b_{j+k}$ and corresponds to the position at which the groove $a_i$ of the upper moving track is located, the position detection devices comprise two classes, respectively, class A position detection devices and class B position detection devices;

the class A position detection devices comprise n position detectors, that are arranged in grooves of the upper moving track in a one-to-one correspondence manner, and according to positions thereof in the grooves of the upper moving track, starting from the initial position, are sequentially a position detector $A_0$, a position detector $A_1$, a position detector $A_2$ . . . , a position detector $A_i$ . . . , and a position detector $A_n$, wherein n is an integer greater than or equal to 0;

the class B position detection devices comprise n position detectors, that are arranged in grooves of the lower moving track in a one-to-one correspondence manner, and according to positions thereof in the grooves of the lower moving track, starting from the initial position, are sequentially a position detector $B_0$, a position detector $B_1$, a position detector $B_2$ . . . , a position detector $B_j$ . . . , and a position detector $B_n$;

any position detector $A_i$ in the class A position detection devices and any position detector $B_j$ in the class B position detection devices can both be connected to the control device separately;

in step (3), whether the moving roller of the upper wire rope moving device and the moving roller of the lower wire rope moving device are both located in grooves of the respective moving tracks thereof at a moment t is determined according to whether a set of data $M_i^A$ and $M_j^B$ is received at the same moment t;

when the data $M_i^A$ is received, it indicates that the moving roller of the upper wire rope moving device falls into a corresponding groove of the upper moving track;

when the data $M_j^B$ is received, it indicates that the moving roller of the lower wire rope moving device falls into a corresponding groove of the lower moving track;

in step (4), magnitudes of i and j in the set of data $M_i^A$ and $M_j^B$ received at the same moment are compared to determine whether the upper wire rope moving device and the lower wire rope moving device are running synchronously under the action of the respective fixed pulse signals thereof: when i=j, it indicates that the upper wire rope moving device and the lower wire rope moving device are running synchronously; when i>j, it indicates that a position of the moving roller of the lower wire rope moving device on the lower moving track is behind a position of the moving roller of the upper wire rope moving device on the upper moving track; and when i<j, it indicates that the position of the moving roller of the upper wire rope moving device on the upper moving track is behind the position of the moving roller of the lower wire rope moving device on the lower moving track.

8. A control device for a synchronous movement apparatus of tracks in a wellbore inspection system, comprising a central processing unit in which a computer program runs, wherein the computer program can be executed to implement the method according to claim 7.

9. A computer-readable medium storing a computer program, wherein the computer program can be executed to implement the method according to claim 7.

* * * * *